United States Patent
Kitamura et al.

(10) Patent No.: US 6,741,406 B2
(45) Date of Patent: May 25, 2004

(54) OBJECTIVE LENS, OPTICAL PICKUP-DEVICE EQUIPPED WITH SAME AND ASSEMBLING METHOD OF SAME

(75) Inventors: Kazuya Kitamura, Tenri (JP); Yukio Kurata, Tenri (JP); Tetsuo Iwaki, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 209 days.

(21) Appl. No.: 09/875,695

(22) Filed: Jun. 6, 2001

(65) Prior Publication Data

US 2002/0005996 A1 Jan. 17, 2002

(30) Foreign Application Priority Data

Jun. 6, 2000 (JP) ........................................ 2000-169624

(51) Int. Cl.$^7$ ................................................. G02B 7/02
(52) U.S. Cl. ........................................ 359/819; 359/822
(58) Field of Search ........................... 359/793, 796, 359/819, 821, 822, 823, 825, 826, 827, 830, 813

(56) References Cited

U.S. PATENT DOCUMENTS

| | | | |
|---|---|---|---|
| 5,831,777 A | * | 11/1998 | Iwasa ........................... 359/826 |
| 2002/0036839 A1 | * | 3/2002 | Kishima et al. ............ 359/819 |

FOREIGN PATENT DOCUMENTS

| | | | |
|---|---|---|---|
| JP | 56-077807 | 6/1981 | ............ G02B/7/02 |
| JP | 60-184013 | 12/1985 | ............ G02B/7/02 |
| JP | 61-4915 | 1/1986 | ............ G02B/7/02 |
| JP | 61-13818 | 1/1986 | ............ G02B/7/02 |
| JP | 62-127512 | 8/1987 | ............ G02B/7/02 |
| JP | 5-4114 | 1/1993 | ............ G02B/7/02 |
| JP | 9-251662 | 9/1997 | ............ G11B/7/135 |
| JP | 10-123388 | 5/1998 | |
| JP | 10-123410 | 5/1998 | |
| JP | 2000-131508 | 5/2000 | |
| KR | 1999-30260 | 4/1999 | ............ G11B/7/09 |

OTHER PUBLICATIONS

Notice of Rejection dated Jun. 23, 2003, issued in corresponding S. Korean Patent Application No. 10–2001–0031356 (with English translation).
Copy of Office Action dated Sep. 16, 2003, issued in corresponding Japanese patent application No. 2000–169624 (with English translation).

* cited by examiner

*Primary Examiner*—Evelyn A Lester
*Assistant Examiner*—Gary O'Neil
(74) *Attorney, Agent, or Firm*—David G. Conlin; Peter J. Manus; Edwards & Angell, LLP

(57) ABSTRACT

An objective lens is made up of a light-source-side lens and a medium-side lens wherein at least either one of rim portions of respective opposing surfaces of the light-source-side lens and the medium-side lens forms a rise-up section projected towards the other lens, the rim portion which forms the rise-up section and the rim portion of the other lens at least partially contact one another, and these two lens are fixed together by an adhesive resin layer formed in a spacing between the respective rim portions. With the foregoing structure, an objective lens made up of a pair of lenses which has high rigidity as a whole and is capable of high speed recording and reproducing by suppressing adverse effects of resonance can be realized.

18 Claims, 7 Drawing Sheets

OBJECTIVE LENS, OPTICAL PICKUP-DEVICE EQUIPPED WITH SAME AND ASSEMBLING METHOD OF SAME

FIELD OF THE INVENTION

The present invention relates to an objective lens composed of a pair of lenses, for use in an optical pick-up for recording or reproducing information on or from an optical information recording medium or the like, and also relates to an optical pick-up device equipped with the objective lens, and an assembling method of the objective lens.

BACKGROUND OF THE INVENTION

The research and development of the light-utilizing technology have been made in a variety of fields including communication, instrumentation, processing, and the like, for the characteristic of light such as high frequency (high speed), or characteristics which realize spacial information processing capability, phase processing, etc., and such light-utilizing technology has been used in practical applications. In the light-utilizing technology, a high-precision objective lens has been used as means for focusing an optical beam. In recent years, the demand for mass-storage information recording devices such as image recording devices, especially those utilizing light, has been increasing, and a development of technology to meet such demand is therefore strongly desired.

To record mass optical information, it is necessary to improve recording media, and what is more, to form a smaller beam spot, that is, to focus a beam spot sufficiently by an objective lens. As already known, the diameter of a beam spot is proportional to the wavelength of light and inversely proportional to the NA (Numerical Aperture) of an objective lens. As for wavelengths, a blue laser diode and a blue or green SHG (second harmonic generation) laser are being developed. Meanwhile, as for deriving larger NA from objective lenses, the NA of a DVD (Digital Versatile Disc) is 0.6, while the NA of a CD (Compact Disc) is 0.45, showing that high density has been achieved.

However, as far as an objective lens is made up of a single lens with two aspheric surfaces, it is difficult to manufacture an objective lens which provides much larger NA. Therefore, an objective lens and an optical pick-up device in which a 2-group lens (a pair of lenses) is adopted to achieve larger NA are disclosed in Japanese Unexamined Patent Publication No. 10-123410/1998 (Tokukaihei 10-123410, published on May 15, 1998).

FIG. 11 shows an arrangement in which an objective lens made up of such a 2-group lens (a pair of lenses) is assembled and set at a lens barrel. An objective lens 101 includes a light-source-side lens 102, a medium-side lens 103, a first lens barrel and aperture 104, and a second lens barrel 105. The light-source-side lens 102 is held by the first lens barrel and aperture 104, the medium-side lens 103 is held by the second lens barrel 105, and the first lens barrel and aperture 104 and the second lens barrel 105 are fixed together via an adhesive resin layer 106.

In addition, an arrangement to combine a 2-group lens without using a lens barrel is disclosed as a compound lens in Japanese Unexamined Patent Publication No. 10-123388/1998 (Tokukaihei 10-123388, published on May 15, 1998). FIG. 12 shows one example. In a compound lens 111, a light-source-side lens 112 and a medium-side lens 113 are held and fixed by a transparent core member 114 which penetrates the lenses.

In such a 2-group lens as mentioned above, two or more lenses are used and these lenses are held and fixed by a lens holding member such as a barrel-type member, that is, a lens barrel, or a core member, and thus combined.

In the above conventional 2-group lens, it is desirable in terms of rigidity to use metal as a material for a lens holding member, but that results in heavier weight. The use of polymeric resin compounds may then be considered, but since these materials have low rigidity, the proportion of a filler such as glass fiber, glass bead, or carbon fiber is increased to cover the disadvantage, which results in an increase in weight, besides, a rigidity as high as that of metal cannot be obtained.

In addition, in an objective lens using a 2-group lens, as the interval of the two lenses is increased, the length of a lens holding member such as a lens barrel accordingly increases, which causes not only heavier weight but also less rigidity due to a torsion, bend, or the like of the lens holding member.

Furthermore, as for optical characteristics, in the case of the objective lens 101 in FIG. 11, for example, since the light-source-side lens 102 and the medium-side lens 103 cannot be manufactured without a manufacturing error (molding error) in general, it is necessary to adjust the interval between the respective centers of the two lenses 102 and 103 when assembling a 2-group lens to cancel an aberration caused by the above error. Therefore, it is difficult to fix the interval between the centers of the two lenses 102 and 103, in such a manner so as to determine the dimensions of the lens barrel (the first lens barrel and aperture 104 and the second lens barrel 105) beforehand considering the calculated interval between the respective centers of the two lenses 102 and 103, and fix the interval between the center of the lens 102 and the center of the lens 103 uniformly based on the dimensions of the lens barrel. In other words, it is necessary to adopt a method to adjust the positioning of the two lenses 102 and 103 to have an optimal interval between the respective centers of the two lenses 102 and 103, by observing a beam spot, and fix them with resin or the like.

In this method, however, the adhesive resin material 106 of low rigidity is adopted between the first lens barrel and aperture 104 which holds the light-source-side lens 102 and the second lens barrel 105 which holds the medium-side lens 103. Therefore, an overall rigidity of the objective lens 1 is further reduced, thus resonance characteristics when driving an actuator for lens focusing and tracking are deteriorated, making high speed recording and reproducing difficult.

SUMMARY OF THE INVENTION

The present invention is achieved in finding a solution to the foregoing problem, and it is therefore an object of the present invention to provide an objective lens including a 2-group lens, which has high rigidity as a whole and is capable of high speed recording and reproducing without deteriorating resonance characteristics when driving an actuator for focus servo and track servo.

In order to attain the above object, an objective lens of the present invention is arranged so as to include a pair of a light-source-side lens provided on the side of a light source and a medium-side lens provided on the side of a recording medium, which are provided facing one another, wherein at least either one of rim portions of respective opposing surfaces of the light-source-side lens and the medium-side lens forms a rise-up section projected towards the other one of the light-source-side lens and the medium-side lens;

the rim portion which forms the rise-up section and the rim portion of the other one of the light-source-side lens and the medium-side lens at least partially contact one another; and the light-source-side lens and the medium-side lens are fixed together by an adhesive resin layer formed in a spacing between the rim portions of the respective opposing surfaces.

According to the above structure, at least either one of the rim portions of the respective opposing surfaces of the two lenses forms a rise-up section projected towards the other lens, and further, the rim portion which forms the rise-up section at least partially contacts the rim portion of the other lens, and the light-source-side lens and the medium-side lens are fixed together by an adhesive resin layer formed in a spacing between the rim portions of the respective opposing surfaces.

Therefore, in the objective lens, the light-source-side lens and the medium-side lens, which are made of glass, for example, directly contact one another at their rim portions, and are fixed together by the adhesive resin layer, without using a lens holding member such as a lens barrel.

Therefore, the structure eliminates the weight increase for the use of a lens holding member. In addition, the adhesive resin layer is restrained from serving as an elastic body, thus increasing rigidity. As a result, it becomes possible to raise the resonance frequency or to lessen the amplitude of an actuator which drives the objective lens during focus servo and track servo using the objective lens, thereby achieving high speed operation.

For a fuller understanding of the nature and advantages of the invention, reference should be made to the ensuing detailed description taken in conjunction with the accompanying drawings.

DESCRIPTION OF THE EMBODIMENTS

Referring to FIGS. 1 through 10, the following description will describe an embodiment of the present invention.

Figure 1:
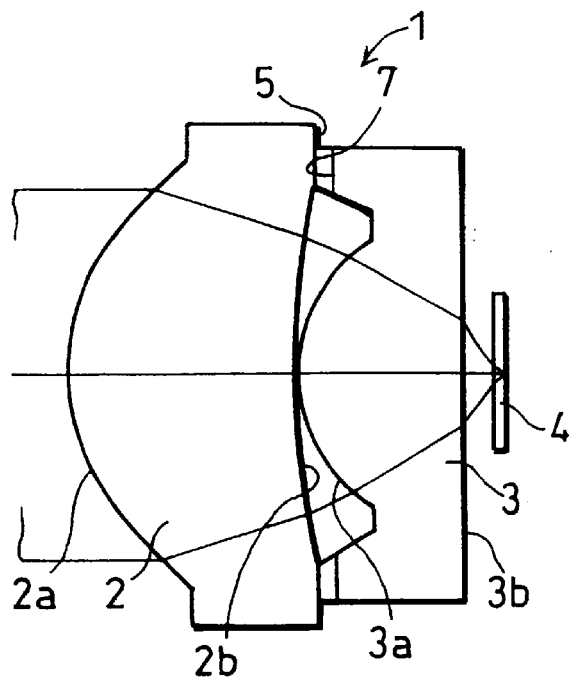
FIG. 1 is a schematic cross section of an objective lens in accordance with an embodiment of the present invention.

As shown in FIG. 1, an objective lens 1 in accordance with the present embodiment is made up of a pair of a light-source-side lens 2 and a medium-side lens 3, namely, the objective lens 1 has a "2-group, 2-lens structure". On the light-source-side lens 2 of the objective lens 1, a collimated laser beam enters, and the laser beam passes through the medium-side lens 3 and forms a beam spot on the recording surface of a recording medium 4.

The NA of the objective lens 1 is 0.85. The both surfaces of the light-source-side lens 2 are aspheric, wherein a light-source-side surface 2a is convex, and a medium-side surface 2b is concave, and this concave surface 2b has a gentle curve. The medium-side lens 3 is a plano-convex lens wherein a light-source-side 3a is convex, a medium-side surface 3b is flat, and the convex light-source-side 3a is aspheric. The foregoing objective lens 1 is adjusted so that the aberration of a laser beam having passed therethrough can be minimized, and the r.m.s. value (hereinafter referred to as "wavefront aberration") after the lens is assembled is set at $0.03 \lambda$ or less. In the recording medium 4, the thickness of a penetration layer provided on the side of the objective lens 1 is set at 0.1 mm.

Figure 2:
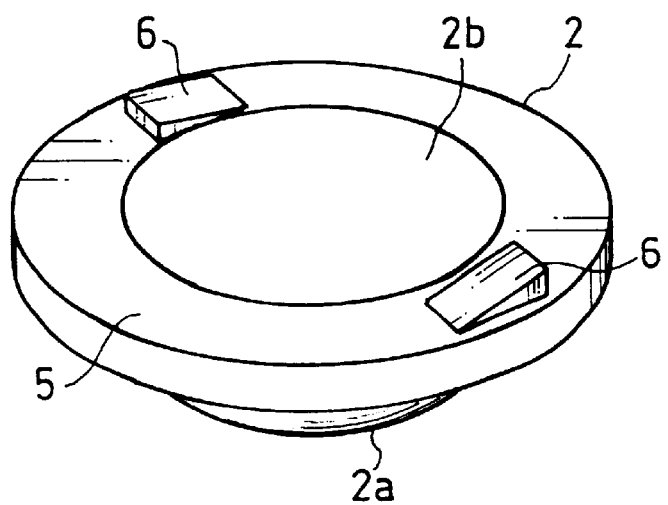
FIG. 2 is a perspective cross section of a light-source-side lens shown in FIG. 1.

As shown in FIG. 2, the light-source-side lens 2 is structured such that a rim portion 5 of the medium-side surface 2b has a ring-shaped flat surface whereon two inclined face forming sections are formed at the interval of 180 degrees so as to be projected from the rim portion 5. These two inclined face forming sections respectively have inclined upper surfaces 6 which are inclined in the same direction along the circumference direction of the light-source-side lens 2.

Figure 3:
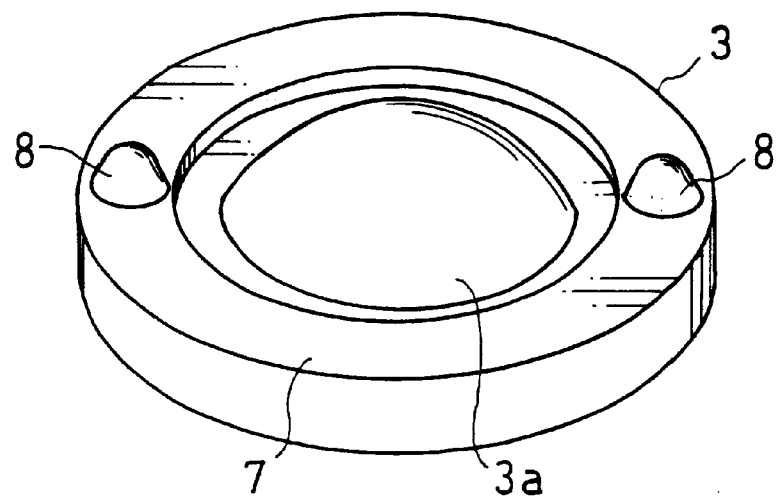
FIG. 3 is a perspective cross section of a medium-side lens shown in FIG. 1.

As shown in FIG. 3, the medium-side lens 3 is structured such that, a rim portion 7 of the light-source-side surface 3a is a ring-shaped rise-up section projected towards the light source (to the light-source-side lens 2). This rim portion 7 of the medium-side lens 3 and the rim portion 5 of the light-source-side lens 2 are to be positioned so as to face one another. The light-source side of the rim portion 7 is a flat surface whereon two spherical protrusions 8 (convex section) are formed. These spherical protrusions 8 protrude from the above flat surface of the rim portion 7, and are located at the interval of 180 degrees. The spherical protrusions 8 and the inclined faces 6 constitute lens interval adjusting sections 10 for adjusting an interval between the center of the lens 2 and the center of the lens 3.

The above light-source-side lens 2 and the medium-side lens 3 are both formed by molding glass, and the inclined faces 6 and the spherical protrusions 8 of the lenses are also formed by molding, at the same time when molding the light-source-side lens 2 and the medium-side lens 3. Therefore, the inclined faces 6 and the spherical protrusions 8 can be formed easily and accurately.

Figure 4:
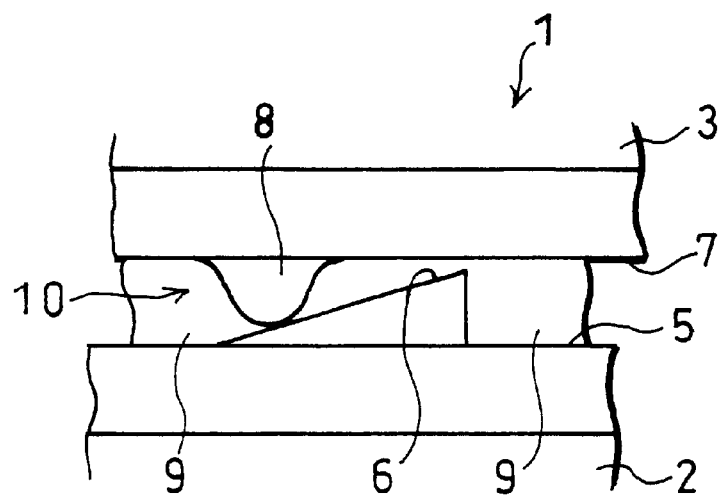
FIG. 4 is an enlarged view of a part of the objective lens showing an example that a lens interval adjusting section of the objective lens shown in FIG. 1 is made up of an inclined protrusion and a spherical protrusion.

In the objective lens 1 as assembled as shown in FIG. 1, the inclined faces 6 of the light-source-side lens 2 and the spherical protrusions 8 of the medium-side lens 3 contact each other, as shown in FIG. 4. In this case, the interval between the light-source-side lens 2 and the medium-side lens 3 is adjusted by rotating at least one of the light-source-side lens 2 and the medium-side lens 3 about the optical axis to some degrees and sliding the spherical protrusions 8 in the rotating direction towards the inclined faces 6. Further, in a portion between the rim portion 5 of the light-source-side lens 2 and the rim portion 7 of the medium-side lens 3 where the inclined faces 6 and the spherical protrusions 8 do not contact one another, that is, in a spacing between the rim portion 5 and the rim portion 7, formed is an adhesive resin layer 9 for fixing the light-source-side lens 2 and the medium-side lens 3.

As described, the objective lens 1 of the present embodiment is arranged such that the light-source-side lens 2 has the inclined faces 6, the medium-side lens 3 has the spherical protrusions 8, which are in contact with each other. The objective lens 1 further includes the adhesive resin layer 9 formed in the spacing between the rim portion 5 and the rim portion 7, and it is therefore possible to combine the light-source-side lens 2 and the medium-side lens 3 directly without using a lens holding member such as a lens barrel.

With the foregoing structure wherein the inclined faces 6 and the spherical protrusions 8 contact each other, the interval between the center of the light-source-side lens 2 and the center of the medium-side lens 3 can be adjusted easily and accurately. Furthermore, the objective lens 1 is optically designed to minimize the wavefront aberration within the above adjustable range. Incidentally, in the objective lens 1, an effective light beam does not pass through the rim portion 5 of the light-source-side lens 2 nor the rim portion 7 of the medium-side lens 3, therefore the adverse effects of the inclined faces 6 and the spherical protrusions 8 on the optical characteristics of the objective lens 1 can be avoided.

Next, the optical design of the objective lens 1 will be explained. Table 1 shows the optical structure of the objective lens 1. In this example, aspheric coefficients satisfy the following equation.

$$Z=(1/r)y^2/\{1+(1-(1+K)(1/r)^2y^2)^{1/2}\}+Ay^4+By^6+Cy^8+Dy^{10}+Ey^{12}+Fy^{14}+Gy^{16}$$

(Z: the depth in the optical axis direction based on the surface apex, y: the height from the optical axis, r: paraxial curvature radius, K: circular cone constant, A to G: aspheric coefficients)

TABLE 1

| SUR- FACE NO. | CURVATURE RADIUS (mm) | SURFACE DISTANCE (mm) | REFRACTIVE INDEX OF GLASS | GLASS ABBE NUMBER |
|---|---|---|---|---|
| STO | INFINITY | 0 | | |
| S1 | 1.67214 | 1.8 | nd = 1.58913 | vd = 61.3 |
| | K: −0.547154 | | | |
| | A: 0.352965E-02 B: −0.297628E-04 C: 0.817575E-03 | | | |
| | D: −0.672788E-03 E: 0.182666E-03 F: −0.25.7842E-04 | | | |
| | G: −0.368467E-05 | | | |
| S2 | 13.5296 | 0.96 | | |
| | K: 53.376623 | | | |
| | A: 0.135569E-01 B: −0.981308E-02 C: −0.864608E-03 | | | |
| | D: 0.911478E-03 E: 0.366842E-03 F: −0.261076E-03 | | | |
| | G: −0.365166E-04 | | | |

TABLE 1-continued

| S3 | 1.45892 | 1.278616 | nd = 1.58913 | vd = 61.3 |
|---|---|---|---|---|
| | K: 0.166987 | | | |
| | A: −0.140440E-01 B: −0.241664E-01 C: 0.904842E-02 | | | |
| | D: −0.312037E-01 E: 0.417409E-01 F: −0.136725E-01 | | | |
| | G: −0.756099E-02 | | | |
| S4 | INFINITY | 0.13 | | |
| S5 | INFINITY | 0.1 | nd = 1.51680 | vd = 64.2 |
| IMAGE | INFINITY | | | |

FOCAL DISTANCE: 1.7644 mm NA: 0.85 WAVELENGTH: 410 mm

In the objective lens 1 of this example, the interval between the center of the light-source-side lens 2 and the center of the medium-side lens 3 is set to 0.096 mm, and the diameter of a light beam is set to φ3 mm. Therefore, the objective lens 1 satisfies the following condition:

$$D/100 \leq d \leq D/10,$$

(d: an interval between the center of the light-source-side lens 2 and the center of the medium-side lens 3, D: the diameter of a light beam incident on the objective lens 1).

In the above formula, when the interval d is larger than D/10, the height of the foregoing rise-up section of the rim portion 7 of the medium-side lens 3 becomes too high, which impairs the flowing of glass when molding the medium-side lens 3, and causes a failure in molded shape. In such a case, it is necessary to adopt a special molding method like vacuum molding to prevent such a problem, and the mold used to make such a lens is worn earlier, which is not cost-effective and lessens the effect of weight reduction.

On the other hand, when the interval d is smaller than D/100, the following problem will be caused. That is, the objective lens 1 is made up in such a manner that the interval d between the respective centers can be adjusted, to cancel a manufacturing error (such as an error on the curvature radius of each surface or an error on the lens thickness) caused when molding the light-source-side lens 102 and the medium-side lens 103. However, if d is smaller than D/100, there is no room to allow such a manufacturing error.

Next, the following will explain an assembling method of the objective lens 1. As mentioned above, in view of a manufacturing error caused when molding the light-source-side lens 2 and the medium-side lens 3, it is desirable to make the interval d between the respective centers of the two lenses adjustable to compensate for such an error when assembling the objective lens 1, and fixed after the adjustment.

To assemble the objective lens 1, first, a wavefront aberration or a tertiary spherical aberration of the light-source-side lens 2 and the medium-side lens 3 manufactured by molding is measured beforehand. Specifically, the aberration is measured by a wavefront aberration measurement device, using a high-precision jig which permits the decentering between the lenses 2 and 3 to be minimized, and also permits the interval d between the center of the lens 2 and the lens 3 to a value close to the designed value (0.096 mm).

Figure 9:
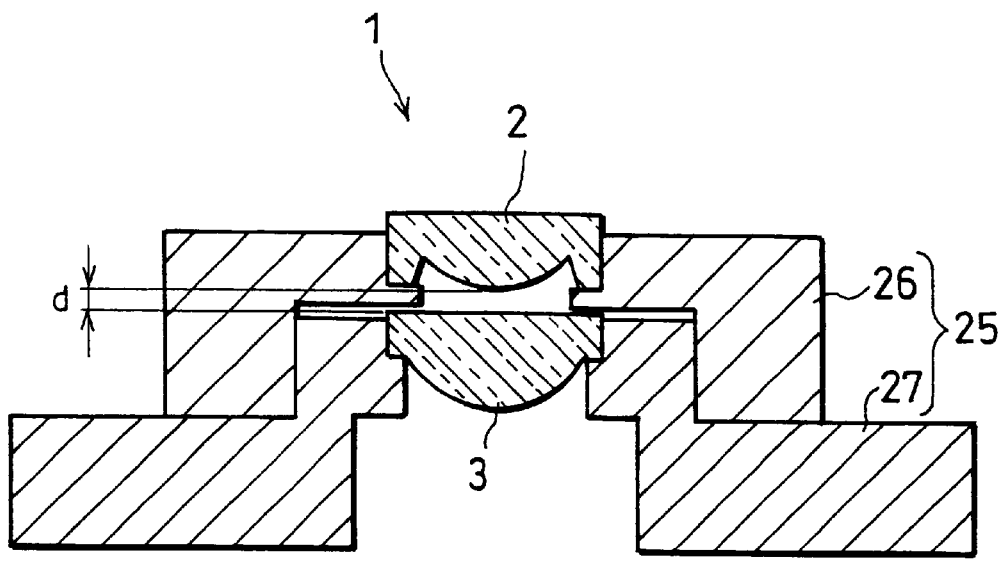
FIG. 9 is a longitudinal section showing a jig used to assemble the objective lens shown in FIG. 1.

As shown in FIG. 9, the above jig 25 for use in the measurement includes a light-source-side lens holding member 26 and a medium-side lens holding member 27, for example, and holds the light-source-side lens 2 and the medium-side lens 3 at an interval d between the center of the lens 2 and the center of the lens 3 of a value close to the designed value.

The measured values obtained by the above measurement include a tertiary spherical aberration caused by a manufacturing error on the curvature radius of lens surface, the lens thickness, etc., and by making the interval between the respective centers of the lenses 2 and 3 adjustable, it is possible to minimize the tertiary spherical aberration.

Then, the optimal interval d between the respective centers of the lenses 2 and 3 which minimizes the wavefront aberration or the tertiary spherical aberration is calculated, and in the actual assembly, the interval d is adjusted at the calculated value and then the lenses 2 and 3 are fixed using ultraviolet curing resin or epoxy resin at the interval d as adjusted. This method eliminates the need to check the shape of a spot or measure an aberration during the adjustment process of the above interval d, achieving easier assembling of the objective lens 1.

Specifically, the interval d between the respective centers of the lenses 2 and 3 is adjusted in the state where the inclined faces 6 of the light-source-side lens 2 and the spherical protrusions 8 of the medium-side lens 3 contact each other, by sliding and rotating one of the lenses 2 and 3 about the optical axis. By this action, a relative position of the light-source-side lens 2 and the medium-side lens 3 is shifted along the optical axis direction for the adjustment of the interval d, and it is therefore possible to set the interval d at the above predetermined value. In this way, the interval d can be adjusted continuously with ease, with the structure made up of the inclined faces 6 and the spherical protrusions 8.

In addition, since the light-source-side lens 2 and the medium-side lens 3 directly contact each other at the inclined faces 6 and the spherical protrusions 8, the adhesive resin layer 9, which fixes the light-source-side lens 2 and the medium-side lens 3, is restrained from serving as an elastic body. Therefore, it becomes possible to increase the resonance frequency or to reduce the amplitude of an actuator which drives the objective lens 1 during focus servo and track servo, thereby achieving high speed operation of the objective lens 1.

In the foregoing preferred embodiment, explanations have been given through the case wherein the inclined faces 6 are formed on the light-source-side lens 2 and the spherical protrusions 8 are formed on the medium-side lens 3. However, the present invention is not limited to the foregoing structure, and, for example, the structure wherein the inclined faces 6 are formed on the medium-side lens 3 and the spherical protrusions 8 are formed on the light-source-side lens 2 may be equally adopted.

Figure 5:
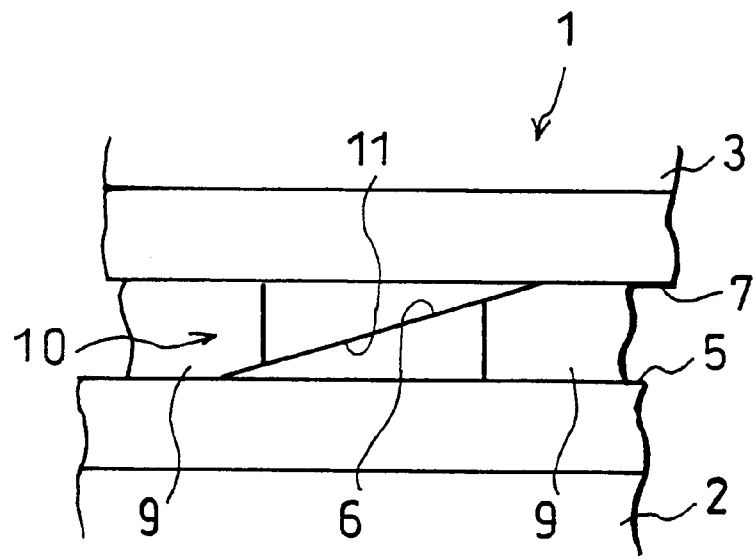
FIG. 5 is another example of the lens interval adjusting section shown in FIG. 4, and is an enlarged view of a part of the objective lens showing an example that the lens interval adjusting section of the objective lens is made up of inclined protrusions.
Figure 6:
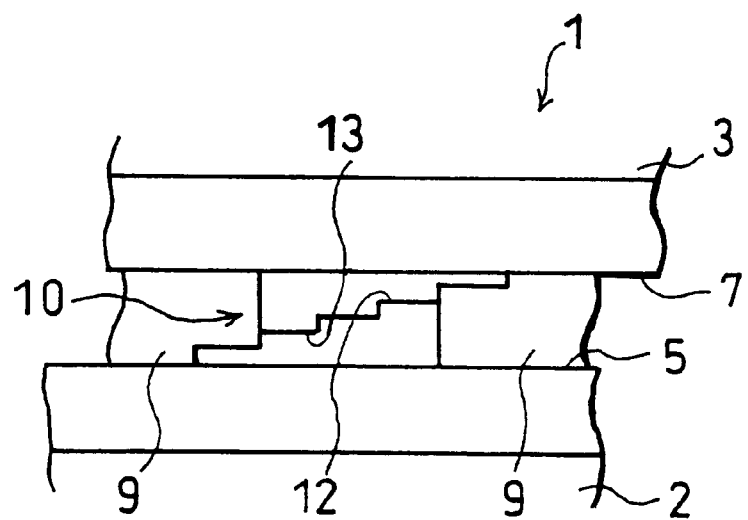
FIG. 6 is another example of the lens interval adjusting section shown in FIG. 4, and is an enlarged view of a part of the objective lens showing an example that the lens interval adjusting section of the objective lens is made up of stepped protrusions.
Figure 7:
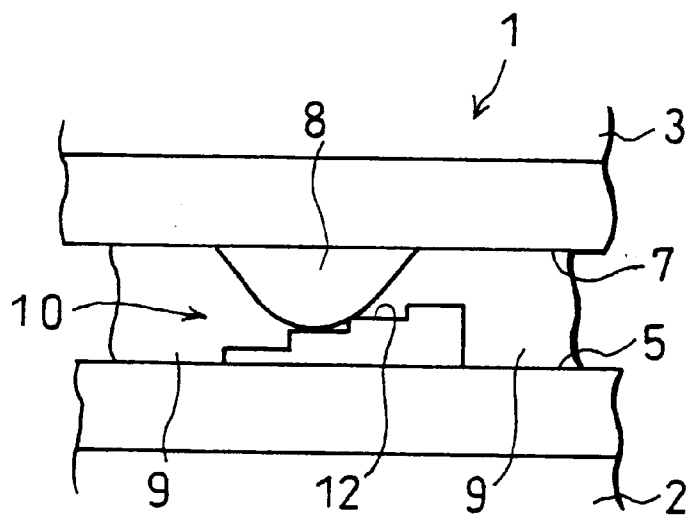
FIG. 7 is another example of the lens interval adjusting section shown in FIG. 4, and is an enlarged view of a part of the objective lens showing an example that the lens interval adjusting section of the objective lens is made up of a stepped protrusion and a spherical protrusion.

For the lens interval adjusting sections 10, in replace of the structure made up of the convex inclined faces 6 and the spherical protrusions 8 adopted in the foregoing preferred embodiment, the structure made up of inclined faces 6 for both of the lenses 2 and 3 as shown in FIG. 5 may be adopted, that is, the inclined faces 6 are formed on the light-source-side lens 2 and the inclined faces 11 are formed on the medium-side lens 3. It may also be also arranged such that the lens interval adjusting sections 10 are made up of two stepped faces 12 and 13 as shown in FIG. 6, or the lens interval adjusting section 10 for one of the lenses 2 and 3 is made up of stepped faces 12 and the lens interval adjusting section 10 for the other of the lenses 2 and 3 is made up of the spherical protrusions 8 as shown in FIG. 7.

Further, the above inclined or stepped faces provided on either of the light-source-side lens 2 or the medium-side lens 3 are not necessarily be convex, and concave inclined or stepped faces may be equally adopted for the lens interval adjusting sections 10.

Furthermore, in the above embodiment, the lens interval adjusting sections 10 are provided at two places of the lenses 2 and 3, but it may be provided at one place of each of the lenses 2 and 3 to make it easier to adjust the inclination of the lenses 2 and 3, or at three or more places. In other words, it is desirable to determine the number of the lens interval adjusting sections 10 according to the sensitivity to the inclination error between the light-source-side lens 2 or the medium-side lens 3 and the necessity for inclination adjustment, in the optical design of each objective lens 1.

Figure 8:
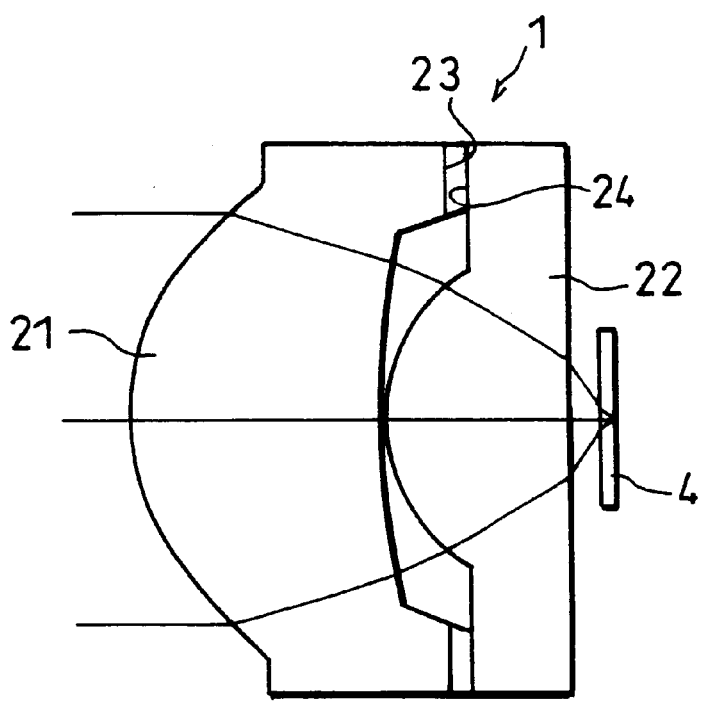
FIG. 8 is a schematic cross section showing another example of the objective lens shown in FIG. 1.

For the lens interval adjusting sections 10, the objective lens 1 of the foregoing embodiment is structured such that the rim portion 7 of the medium-side lens 3 forms a rise-up section projected towards the light source (to the light-source-side lens 2) as shown in FIG. 3, and the rim portion 5 of the light-source-side lens 2 does not rise up. However, the lens interval adjusting sections 10 of the present invention is not limited to the foregoing structure, and, for example, the structure of the objective lens 1 as shown in FIG. 8 wherein a rim portion 23 of a light-source-side lens 21 forms a rise-up section projected towards the recording medium 4, and a rim portion 24 of a medium-side lens 22 does not rise up may be adopted. Other than the lens interval adjusting section 10, the objective lens 1 shown in FIG. 8 has the same structure as those of the foregoing objective lens 1 of FIG. 1.

In the foregoing preferred embodiment, for the light-source-side lenses 2 and 21 and the medium-side lenses 3 and 22, those made of glass are adopted, however, those made of plastic may be adopted.

The foregoing objective lens 1 is applicable to an optical pick-up device. The below-explained optical pick-up device of the present embodiment has a well-known structure, except that it is equipped with the above objective lens 1.

Figure 10:
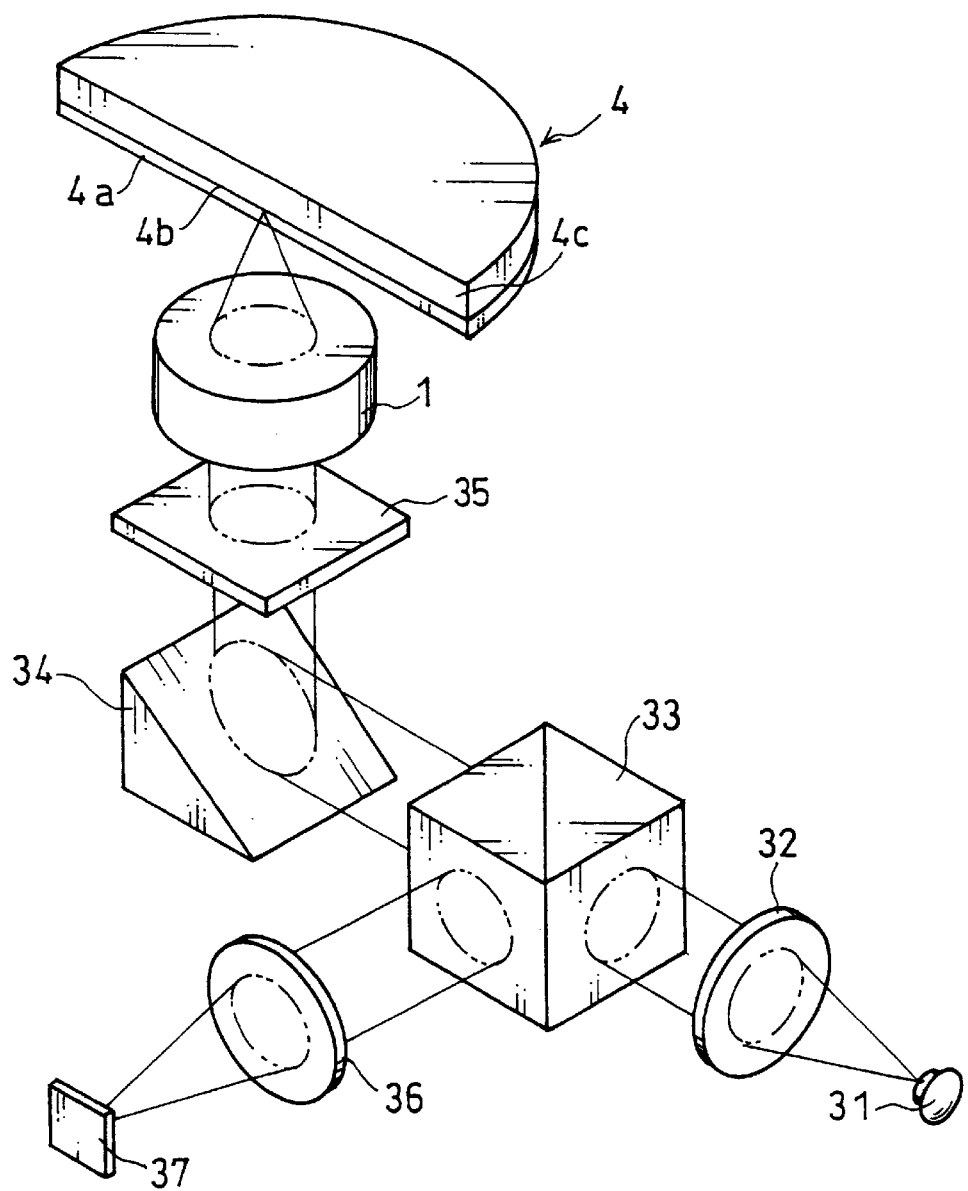
FIG. 10 is a schematic perspective cross section showing an example of an optical pick-up device equipped with the objective lens shown in FIG. 1.
Figure 11:
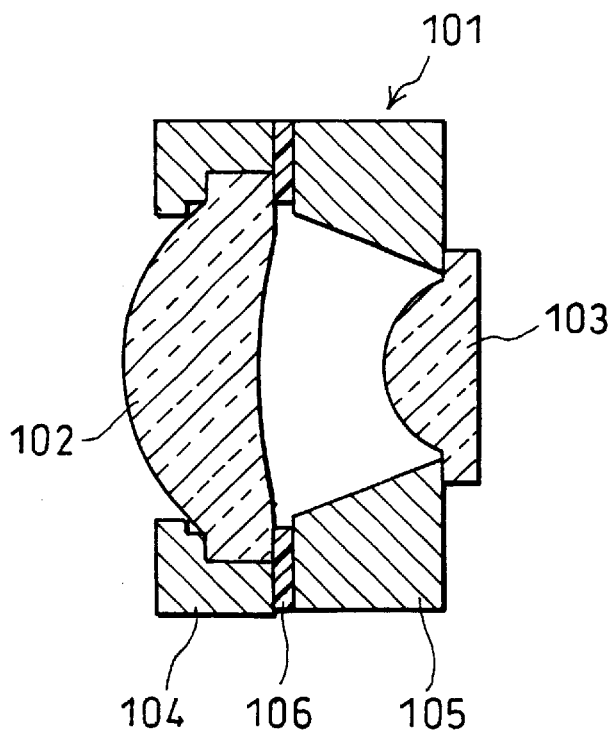
FIG. 11 is a longitudinal section showing a conventional objective lens.
Figure 12:
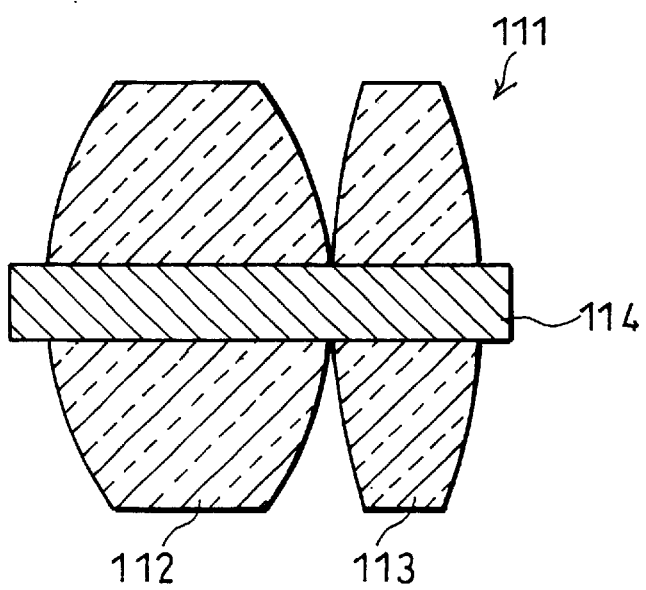
FIG. 12 is a longitudinal section showing another conventional objective lens.

That is, as shown in FIG. 10, the optical pick-up device includes a LD (laser diode) 31 as a light source, a collimating lens 32, a polarized beam splitter 33, a rise-up mirror 34, a ¼ wavelength plate 35, the objective lens 1, a condenser lens 36, and a light receiving section 37. The recording medium 4 includes a light-transmissive layer 4a, a recording surface 4b, and a substrate 4c of 0.1 mm thick.

In the optical pick-up device, linearly polarized laser beam emitted from the LD 31 is collimated by the collimating lens 32, passes through the polarized beam splitter 33, bent 90 degrees by the rise-up mirror 34, and converted to circulated polarized light at the ¼ wavelength plate 35. Then, the laser beam enters the objective lens 1 and is focused, then passes through the light penetration layer 4a of the recording medium 4 and forms a beam spot on the recording surface 4b.

Meanwhile, the laser beam reflected by the recording surface 4b follows the foregoing path in reverse, and is shaped back to a linear polarized light beam by the ¼ wavelength plate 35. Since the polarized direction of the laser beam here is rotated 90 degrees from the one before entering the recording medium 4, the laser beam is bent almost 90 degrees by the polarized beam splitter 33. Then, the laser beam passes through the condenser lens 36 and enters the light receiving section 37.

In addition, since the diameter of a laser beam incident on the objective lens 1 has a direct effect on the thickness of an optical pick-up device, it is desirable to set the diameter of the laser beam at less than 5 mm. With this setting, it becomes possible to install a disk drive using the objective lens 1, that is, the optical pick-up device equipped with the objective lens 1, in a 5-inch bay for a disk drive provided in the cabinet of a commercial desk-top personal computer, for example.

That is, when the diameter of an incident light beam is 5 mm, the focal length of the objective lens 1 is 3.6 mm with the NA of 0.7, and 2.9 mm with the NA of 0.85. It is apparent from FIG. 10 that, if the error-including dimensions of the collimating lens 32 and the rise-up mirror 34, the interval of principal points and the focal length of the objective lens 1, and the like, become larger, the thickness of an optical pick-up device is increased over 25 mm. Considering other factors such as a motor (not shown) for rotating a disk, the thickness of a disk, the cabinet (not shown) for a drive, it is difficult to set the overall thickness of the drive to be suited for the installation in the above 5-inch bay. Therefore, it is desirable to set the diameter of an incident light beam to be less than 5 mm, and such a structure can enhance the versatility of a disk drive device equipped with the objective lens 1.

Although there is no lower limit for the diameter of the incident light beam, in view of a manufacturable (moldable) thickness of each of the lenses which constitute the objective lens 1, and an operable distance, it is desirable to set the diameter to be not less than 1.5 mm.

Further, as shown in FIGS. 1 and 8, the foregoing optical pick-up device has a structure of a so-called infinite system, in which a parallel beam enters the objective lens 1. However, the optical pick-up of the present invention is not limited to the infinite system, and a finite system, in which focused or diverged light beam enters the objective lens 1, may be adopted as well.

The foregoing method and structure realizes the objective lens 1 of light weight, and the light-source-side lens 2 and the medium-side lens 3 directly contact without direct involvement of the adhesive resin layer. Therefore, it is possible to lessen resonance or raise resonance frequency during the operation of an actuator such as focus servo and track servo, which is advantageous for high speed operation of the foregoing servo.

Furthermore, when assembling the objective lens 1, the interval d between the center of the light-source-side lens 2 and the center of the medium-side lens 3 can be easily adjusted by the lens interval adjusting section 10. By this adjustment, the spherical aberration and the wavefront aberration as a whole can be kept satisfactory even if the lenses 2 and 3 have manufacturing errors.

As discussed above, the objective lens of the present invention is arranged so as to include a pair of a light-source-side lens provided on the side of a light source and a medium-side lens provided on the side of a recording medium, which are provided facing one another, wherein at least a part of at least either one of rim portions of respective opposing surfaces of the light-source-side lens and the medium-side lens forms a rise-up section projected towards the other one of the light-source-side lens and the medium-side lens, the objective lens further including:

lens interval adjusting sections for adjusting an interval in an optical axis direction between the light-source-side lens and the medium-side lens by rotating either one of the light-source-side lens and the medium-side lens about an optical axis, the lens interval adjusting sections contacting one another, which are formed on the rim portion which forms the rise-up section and the rim portion facing the rise-up section respectively.

According to the foregoing structure, at least a part of at least either one of rim portions of respective opposing surfaces of the light-source-side lens and the medium-side lens forms a rise-up section projected towards the other one of the light-source-side lens and the medium-side lens, and the objective lens further includes lens interval adjusting sections for adjusting an interval in an optical axis direction between the light-source-side lens and the medium-side lens by rotating either one of the light-source-side lens and the medium-side lens about an optical axis, which are formed on the rim portion which forms the rise-up section and the rim portion facing the rise-up section so as to be in contact with one another.

Therefore, in the objective lens, since the light-source-side lens and the medium-side lens, which are made of glass, for example, directly contact at the lens interval adjusting sections formed on the rim portions of the lenses, high rigidity is obtained, and it becomes possible to increase the resonance frequency or to reduce the amplitude of an actuator which drives the objective lens during focus servo and track servo using the objective lens, thereby achieving high speed operation.

Moreover, with the foregoing lens interval adjusting sections, by adjusting the interval between the lenses in the optical axis direction by rotating either of the lenses, the interval between the center of the light-source-side lens and the center of the medium-side lens can be adjusted easily.

The foregoing objective lens may be arranged such that the lens interval adjusting sections are made up of concave or convex inclined faces formed on the respective rim portions, or may be arranged such that one of the lens interval adjusting section is made up of a convex inclined face, and the other lens interval adjusting section is made up of a concave inclined face.

According to the above structure of the lens interval adjusting sections, the interval between the center of the light-source-side lens and the center of the medium-side lens can be adjusted easily and continuously with a simple structure.

The foregoing objective lens may be arranged such that the lens interval adjusting sections are made up of convex or concave stepped faces formed on the respective rim portions, or may be arranged such that one of the lens interval adjusting section is made up of a convex stepped face, and the other lens interval adjusting section is made up of a concave stepped face.

According to the above structure of the lens interval adjusting sections, the interval between the center of the light-source-side lens and the center of the medium-side lens can be adjusted easily and continuously with a simple structure.

The foregoing objective lens may be arranged such that the lens interval adjusting section formed on the rim portion of one of the light-source-side lens and the medium-side lens is made up of a convex or concave inclined face, and the lens interval adjusting section formed on the rim portion of the other of the light-source-side lens and the medium-side lens is a convex section.

According to the above structure of the lens interval adjusting sections, the interval between the center of the light-source-side lens and the center of the medium-side lens can be adjusted easily and continuously with a simple structure.

The foregoing objective lens may be arranged such that the lens interval adjusting section formed on the rim portion of one of the light-source-side lens and the medium-side lens is made up of a convex or concave stepped face, and the lens interval adjusting section formed on the rim portion of the other of the light-source-side lens and the medium-side lens is a convex section.

According to the above structure of the lens interval adjusting sections, the interval between the center of the light-source-side lens and the center of the medium-side lens can be adjusted easily and continuously with a simple structure.

The foregoing objective lens may be arranged so as to further include:

an adhesive resin layer made of polymeric resin for fixing the light-source-side lens and the medium-side lens together is formed in a spacing between the rim portion of the light-source-side lens and the rim portion of the medium-side lens.

According to the foregoing structure, the light-source-side lens and the medium-side lens are fixed together by the adhesive resin layer, without using a lens holding member such as a lens barrel, and a problem of an increase in overall weight of the objective lens can be eliminated. Moreover, the light-source-side lens and the medium-side lens directly contact one another at the lens interval adjusting sections, the elastic characteristic of the adhesive resin layer can be suppressed. As a result, it becomes possible to increase the resonance frequency or to reduce the amplitude of an actuator which drives the objective lens during focus servo and track servo, thereby achieving high speed operation of the objective lens.

The foregoing objective lens composed of a pair of the light-source-side lens and the medium-side lens may be arranged such that a numerical aperture is not less than 0.7, and the interval between the center of the light-source-side lens and the center of the medium-side lens is not more than 0.5 mm.

According to the foregoing structure, the objective lens is composed of a pair of the light-source-side lens and the medium-side lens, and a numerical aperture is not less than 0.7, and the interval between the center of the light-source-side lens and the center of the medium-side lens is not more than 0.5 mm. The foregoing objective lens can therefore be used for high density recording, and can be molded easier than normal molding, for example.

Although there is no upper limit for NA, it is desirable to set NA to be not more than 0.95. In the case of the optical disk device of the near-field type, the NA of not less than 1 may be adopted.

The foregoing objective lens may be structured in such a manner that the diameter of an effective incident light beam is less than 5 mm.

According to the above structure, the objective lens can be made thinner, and therefore an overall thickness of the optical pick-up device equipped with the objective lens can be downsized to 25 mm or less, which in turns realizes a thinner disk drive using the objective lens. Consequently, the above disk drive can be installed in a 5-inch bay for a disk drive provided in the cabinet of a commercial desk-top personal computer, for example. Thus, the versatility of a disk drive equipped with the objective lens can be enhanced.

The foregoing objective lens may be arranged such that a diameter of an effective light beam incident on the objective lens and the interval between the center of the light-source-side lens and the center of the medium-side lens satisfy the condition of:

$$D/100 \leq d \leq D/10,$$

wherein d is the interval between the center of the light-source-side lens and the center of the medium-side lens, and D is the diameter of the effective light beam incident on the objective lens.

In the above formula, when the interval d is larger than D/10, the height of the foregoing rise-up section of the rim portion of a lens becomes too high, which impairs the flowing of glass when molding the lens, and causes a failure in molded shape. In such a case, it is necessary to adopt a special molding method like vacuum molding to prevent such a problem, and the mold used to make such a lens is worn earlier, which is not cost-effective and the effect of achieving a lighter weight is suppressed.

On the other hand, when the interval d is smaller than D/100, the following problem will be caused. That is, the objective lens is made up in such a manner that the interval d between the respective centers of the lenses can be adjusted, to cancel a manufacturing error (such as an error on the curvature radius of each surface or an error on the lens thickness) caused when molding the light-source-side lens and the medium-side lens. However, if d is smaller than D/100, there is no room to allow such a manufacturing error.

The foregoing structure of the present invention eliminates the foregoing problem by setting the interval d between the respective centers of the lenses so as to satisfy the above condition.

The optical pick-up device of the present invention includes the foregoing objective lens.

Consequently, it becomes possible to increase the resonance frequency or to reduce the amplitude of an actuator which drives the objective lens during focus servo and track servo, thereby achieving high speed operation.

The assembling method of the objective lens of the present invention is arranged so as to include the steps of: i) measuring an aberration beforehand in a state where the light-source-side lens and the medium-side lens are positioned using a jig at a predetermined interval between the center of the light-source side lens and the center of the medium-side lens; ii) obtaining by calculation an optimal value for an interval between the center of the light-source side lens and the center of the medium-side lens for a minimization of the aberration; and iii) fixing the light-source side lens and the medium-side lens after adjusting the interval to the optimal value.

The above arrangement eliminates the need to check the shape of a spot or measure an aberration during the adjustment process of the interval between the centers of the lenses, thereby permitting the objective lens to be assembled in a simpler manner.

In the above assembling method, the aberration may be a tertiary spherical aberration.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An objective lens, comprising:
   a light-source-side lens provided on the side of a light source and a medium-side lens provided on the side of a recording medium, which are provided facing one another,
   wherein at least either one of rim portions of respective opposing surfaces of said light-source-side lens and said medium-side lens forms a rise-up section projected towards the other one of said light-source-side lens and said medium-side lens;
   the rim portion which forms said rise-up section and the rim portion of the other one of said light-source-side lens and said medium-side lens at least partially contact one another; and
   said light-source-side lens and said medium-side lens are fixed together by an adhesive resin layer formed in a spacing between the rim portions of the respective opposing surfaces.

2. The objective lens of claim 1, wherein:
a numerical aperture is not less than 0.7; and
an interval between a center of said light-source-side lens and a center of said medium-side lens is not more than 0.5 mm.

3. The objective lens of claim 1, wherein:
a light beam incident on said objective lens has a smaller diameter than 5 mm.

4. An optical pick-up device comprising said objective lens of claim 1.

5. An objective lens, comprising:
a light-source-side lens provided on the side of a light source and a medium-side lens provided on the side of a recording medium, which are provided facing one another,
wherein at least a part of at least either one of rim portions of respective opposing surfaces of said light-source-side lens and said medium-side lens forms a rise-up section projected towards the other one of said light-source-side lens and said medium-side lens,
said objective lens further comprising:
lens interval adjusting sections for adjusting an interval in an optical axis direction between said light-source-side lens and said medium-side lens by rotating either one of said light-source-side lens and said medium-side lens about an optical axis, said lens interval adjusting sections contacting one another, which are formed on the rim portion which forms said rise-up section and the rim portion facing the rise-up section respectively.

6. The objective lens of claim 5, wherein:
each of said lens interval adjusting sections is made up of a concave or convex inclined face.

7. The objective lens of claim 5, wherein:
each said lens interval adjusting sections is made up of a convex or concave stepped face.

8. The objective lens of claim 5, wherein:
said lens interval adjusting section formed on the rim portion of one of said light-source-side lens and said medium-side lens is made up of a convex or concave inclined face, and said lens interval adjusting section formed on said rim portion of the other of said light-source-side lens and said medium-side lens is a convex section.

9. The objective lens of claim 8, wherein:
said convex section has a spherical shape.

10. The objective lens of claim 5, wherein:
said lens interval adjusting section formed on the rim portion of one of said light-source-side lens and said medium-side lens is made up of a convex or concave stepped face, and said lens interval adjusting section formed on said rim portion of the other of said light-source-side lens and said medium-side lens is a convex section.

11. The objective lens of claim 10, wherein:
said convex section has a spherical shape.

12. The objective lens of claim 5, wherein:
an adhesive resin layer made of polymeric resin for fixing said light-source-side lens and said medium-side lens together is formed in a spacing between the rim portion of the light-source-side lens and the rim portion of said medium-side lens.

13. The objective lens of claim 5, wherein:
a numerical aperture is not less than 0.7; and
an interval between a center of said light-source-side lens and a center of said medium-side lens is not more than 0.5 mm.

14. The objective lens of claim 5, wherein:
an effective light beam incident on said objective lens has a smaller diameter than 5 mm.

15. The objective lens of claim 5, wherein:
a diameter of an effective light beam incident on said objective lens and an interval between a center of said light-source-side lens and a center of said medium-side lens satisfy the condition of:

$$D/100 \leq d \leq D/10,$$

wherein d is the interval between the center of said light-source-side lens and the center of said medium-side lens, and D is the diameter of the effective light beam incident on said objective lens.

16. An optical pick-up device comprising said objective lens of claim 5.

17. An assembling method of an objective lens comprising a light-source-side lens provided on the side of a light source and a medium-side lens provided on the side of a recording medium, which are provided facing one another, comprising the steps of:
measuring an aberration beforehand in a state where said light-source-side lens and said medium-side lens are positioned using a jig at a predetermined interval between a center of said light-source side lens and a center of said medium-side lens;
obtaining by calculation an optimal value for an interval between the center of said light-source side lens and the center of said medium-side lens for a minimization of the aberration; and
fixing said light-source side lens and said medium-side lens after adjusting the interval to the optimal value.

18. The assembling method of the objective lens of claim 17, wherein:
said aberration is a tertiary spherical aberration.

* * * * *